United States Patent
Hekimian-Williams

(10) Patent No.: US 11,847,104 B1
(45) Date of Patent: Dec. 19, 2023

(54) METHOD AND SYSTEM FOR FACILITATING DATABASE MIGRATION

(71) Applicant: JPMorgan Chase Bank, N.A., New York, NY (US)

(72) Inventor: Dan Hekimian-Williams, Tampa, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 14 days.

(21) Appl. No.: 17/805,345

(22) Filed: Jun. 3, 2022

(51) Int. Cl.
- *G06F 16/00* (2019.01)
- *G06F 16/21* (2019.01)
- *G06F 16/27* (2019.01)
- *G06F 16/215* (2019.01)
- *G06F 16/28* (2019.01)

(52) U.S. Cl.
CPC .......... *G06F 16/214* (2019.01); *G06F 16/215* (2019.01); *G06F 16/275* (2019.01); *G06F 16/278* (2019.01); *G06F 16/285* (2019.01)

(58) Field of Classification Search
CPC ...... G06F 16/214; G06F 16/215; G06F 16/75; G06F 16/278; G06F 16/285
See application file for complete search history.

(56) References Cited

U.S. PATENT DOCUMENTS

| | | | |
|---|---|---|---|
| 11,163,669 B1 * | 11/2021 | Torun | G06F 8/65 |
| 2022/0075773 A1 * | 3/2022 | Sakamaki | G06N 5/025 |

FOREIGN PATENT DOCUMENTS

CN  115329823 A  * 11/2022

OTHER PUBLICATIONS

English Text version of CN-115329823-A "Dynamic depth migration predicting method and device for delaying the temperature of furnace tube of coking heating furnace" (Year: 2022).*

* cited by examiner

*Primary Examiner* — Diedra McQuitery
(74) *Attorney, Agent, or Firm* — Greenblum & Bernstein, P.L.C.

(57) ABSTRACT

A method for facilitating automated synchronous data migration in live databases is disclosed. The method includes parsing a source database to identify characteristics, the characteristics corresponding to data tables in the source database; categorizing the data tables into groups based on the identified characteristics; validating the data tables in the groups by performing several tests; copying the groups to a target database based on a result of the validating; reviewing the copied groups to detect errors; and automatically initiating corrective actions in response to the detected errors. Additionally, the method further includes receiving new data sets from an application for persistence in the source database, the source database corresponding to a live database; generating duplicate data sets that correspond to the new data sets; and synchronously persisting, in real-time, the new data sets in the source database and the duplicate data sets in the target database.

20 Claims, 7 Drawing Sheets

600

METHOD AND SYSTEM FOR FACILITATING DATABASE MIGRATION

BACKGROUND

1. Field of the Disclosure

This technology generally relates to methods and systems for migrating databases, and more particularly to methods and systems for facilitating automated synchronous data migration from a live database system to a target database system.

2. Background Information

Many business entities rely on complex database ecosystems to provide services for users. Often, to ensure operability with supported database software and hardware components, continual planned migration of data from one physical computing device to a new physical computing device is required. Historically, implementations of conventional data migration techniques have resulted in varying degrees of success with respect to minimizing database downtime and maximizing data transfer efficiency.

One drawback of using the conventional data migration techniques is that in many instances, databases in the complex database ecosystems retain vast amounts of data. As a result, long database downtimes are necessary to extract and reload the vast amounts of data because the conventional data migration techniques require unchanging data. Additionally, many features of the databases must be disabled during migration to improve data transfer efficiency.

Therefore, there is a need for an automated process that facilitates synchronous data migration from a live database system to a target database system with minimal database downtime.

SUMMARY

The present disclosure, through one or more of its various aspects, embodiments, and/or specific features or sub-components, provides, inter alia, various systems, servers, devices, methods, media, programs, and platforms for facilitating automated synchronous data migration from a live database system to a target database system.

According to an aspect of the present disclosure, a method for facilitating automated synchronous data migration in live databases is disclosed. The method is implemented by at least one processor. The method may include parsing at least one source database to identify at least one characteristic, the at least one characteristic may correspond to each of a plurality of data tables; categorizing the plurality of data tables into at least one group based on the identified at least one characteristic; validating the plurality of data tables in each of the at least one group by performing at least one test; copying the at least one group to at least one target database based on a result of the validating; reviewing the copied at least one group to detect at least one error; and automatically initiating at least one corrective action in response to the detected at least one error.

In accordance with an exemplary embodiment, the method may further include receiving at least one new data set from at least one application for persistence in the at least one source database, the at least one source database may correspond to a live database; generating at least one duplicate data set that corresponds to the at least one new data set; and synchronously persisting, in real-time, the at least one new data set in the at least one source database and the at least one duplicate data set in the at least one target database.

In accordance with an exemplary embodiment, prior to the persisting, the method may further include parsing the at least one new data set to identify at least one trigger, the at least one trigger may correspond to a requested action; and reconfiguring the identified at least one trigger in the at least one duplicate data set to prevent activation.

In accordance with an exemplary embodiment, the at least one characteristic may include at least one from among a primary key characteristic and a date characteristic, the primary key characteristic may relate to whether a primary key is present in the plurality of data tables, and the date characteristic may relate to a data partitioned by date.

In accordance with an exemplary embodiment, the at least one test may include at least one from among a first test that determines read access to a corresponding source table, a second test that determines whether a partition key column and an audit column are in the plurality of data tables, a third test that determines trigger operability, and a fourth test that determines an order of the plurality of data tables based on a foreign key and a parent key.

In accordance with an exemplary embodiment, to review the copied at least one group, the method may further include comparing the copied at least one group in the at least one target database with the corresponding at least one group in the at least one source database; and detecting the at least one error based on a result of the comparing, the at least one error may include at least one from among a missing data error, an extra data error, and a different data error.

In accordance with an exemplary embodiment, the comparing may include at least one from among a first assessment of individual data values within the copied at least one group and a second assessment of data rows within the copied at least one group.

In accordance with an exemplary embodiment, the method may further include automatically generating at least one activity log, the at least one activity log may include information that relates to the copying of the at least one group, the result of the comparing, the detected at least one error, and the at least one corrective action; and persisting the at least one activity log in the at least one target database.

In accordance with an exemplary embodiment, the method may further include generating a notification when the at least one error is detected, the notification may include information that relates to the at least one error and at least one suggested corrective action; identifying at least one responsible party based on the at least one error; and transmitting the notification to the identified at least one responsible party.

According to an aspect of the present disclosure, a computing device configured to implement an execution of a method for facilitating automated synchronous data migration in live databases is disclosed. The computing device including a processor; a memory; and a communication interface coupled to each of the processor and the memory, wherein the processor may be configured to parse at least one source database to identify at least one characteristic, the at least one characteristic may correspond to each of a plurality of data tables; categorize the plurality of data tables into at least one group based on the identified at least one characteristic; validate the plurality of data tables in each of the at least one group by performing at least one test; copy the at least one group to at least one target database based on a result of the validating; review the copied at least one group to detect at least one error; and automatically initiate at least one corrective action in response to the detected at least one error.

In accordance with an exemplary embodiment, the processor may be further configured to receive at least one new data set from at least one application for persistence in the at least one source database, the at least one source database may correspond to a live database; generate at least one duplicate data set that corresponds to the at least one new data set; and synchronously persist, in real-time, the at least one new data set in the at least one source database and the at least one duplicate data set in the at least one target database.

In accordance with an exemplary embodiment, prior to the persisting, the processor may be further configured to parse the at least one new data set to identify at least one trigger, the at least one trigger may correspond to a requested action; and reconfigure the identified at least one trigger in the at least one duplicate data set to prevent activation.

In accordance with an exemplary embodiment, the at least one characteristic may include at least one from among a primary key characteristic and a date characteristic, the primary key characteristic may relate to whether a primary key is present in the plurality of data tables, and the date characteristic may relate to a data partitioned by date.

In accordance with an exemplary embodiment, the at least one test may include at least one from among a first test that determines read access to a corresponding source table, a second test that determines whether a partition key column and an audit column are in the plurality of data tables, a third test that determines trigger operability, and a fourth test that determines an order of the plurality of data tables based on a foreign key and a parent key.

In accordance with an exemplary embodiment, to review the copied at least one group, the processor may be further configured to compare the copied at least one group in the at least one target database with the corresponding at least one group in the at least one source database; and detect the at least one error based on a result of the comparing, the at least one error may include at least one from among a missing data error, an extra data error, and a different data error.

In accordance with an exemplary embodiment, the comparing may include at least one from among a first assessment of individual data values within the copied at least one group and a second assessment of data rows within the copied at least one group.

In accordance with an exemplary embodiment, the processor may be further configured to automatically generate at least one activity log, the at least one activity log may include information that relates to the copying of the at least one group, the result of the comparing, the detected at least one error, and the at least one corrective action; and persist the at least one activity log in the at least one target database.

In accordance with an exemplary embodiment, the processor may be further configured to generate a notification when the at least one error is detected, the notification may include information that relates to the at least one error and at least one suggested corrective action; identify at least one responsible party based on the at least one error; and transmit the notification to the identified at least one responsible party.

According to an aspect of the present disclosure, a non-transitory computer readable storage medium storing instructions for facilitating automated synchronous data migration in live databases is disclosed. The storage medium including executable code which, when executed by a processor, may cause the processor to parse at least one source database to identify at least one characteristic, the at least one characteristic may correspond to each of a plurality of data tables; categorize the plurality of data tables into at least one group based on the identified at least one characteristic; validate the plurality of data tables in each of the at least one group by performing at least one test; copy the at least one group to at least one target database based on a result of the validating; review the copied at least one group to detect at least one error; and automatically initiate at least one corrective action in response to the detected at least one error.

In accordance with an exemplary embodiment, the executable code, when executed by the processor, may further cause the processor to receive at least one new data set from at least one application for persistence in the at least one source database, the at least one source database may correspond to a live database; generate at least one duplicate data set that corresponds to the at least one new data set; and synchronously persist, in real-time, the at least one new data set in the at least one source database and the at least one duplicate data set in the at least one target database.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
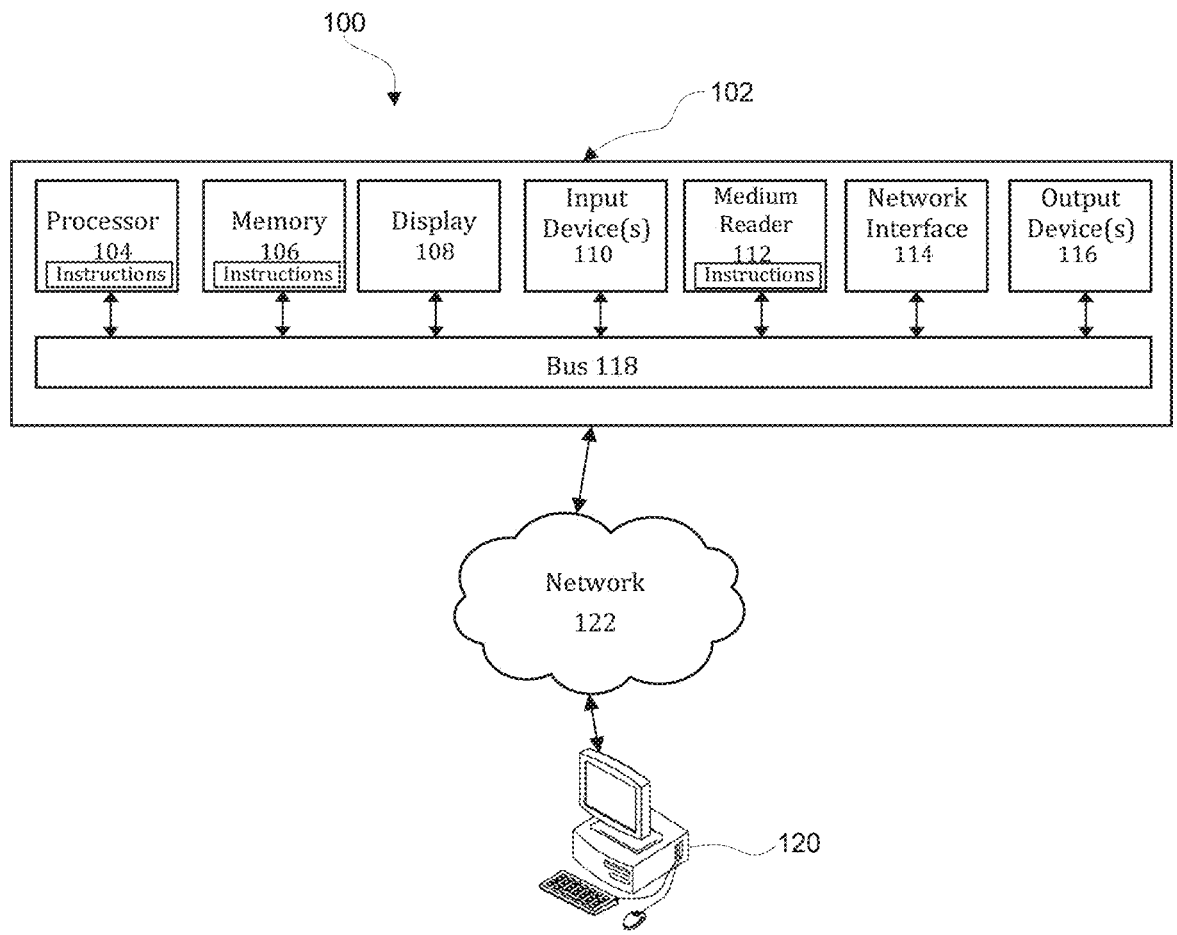
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating automated synchronous data migration from a live database system to a target database system.

Figure 2:
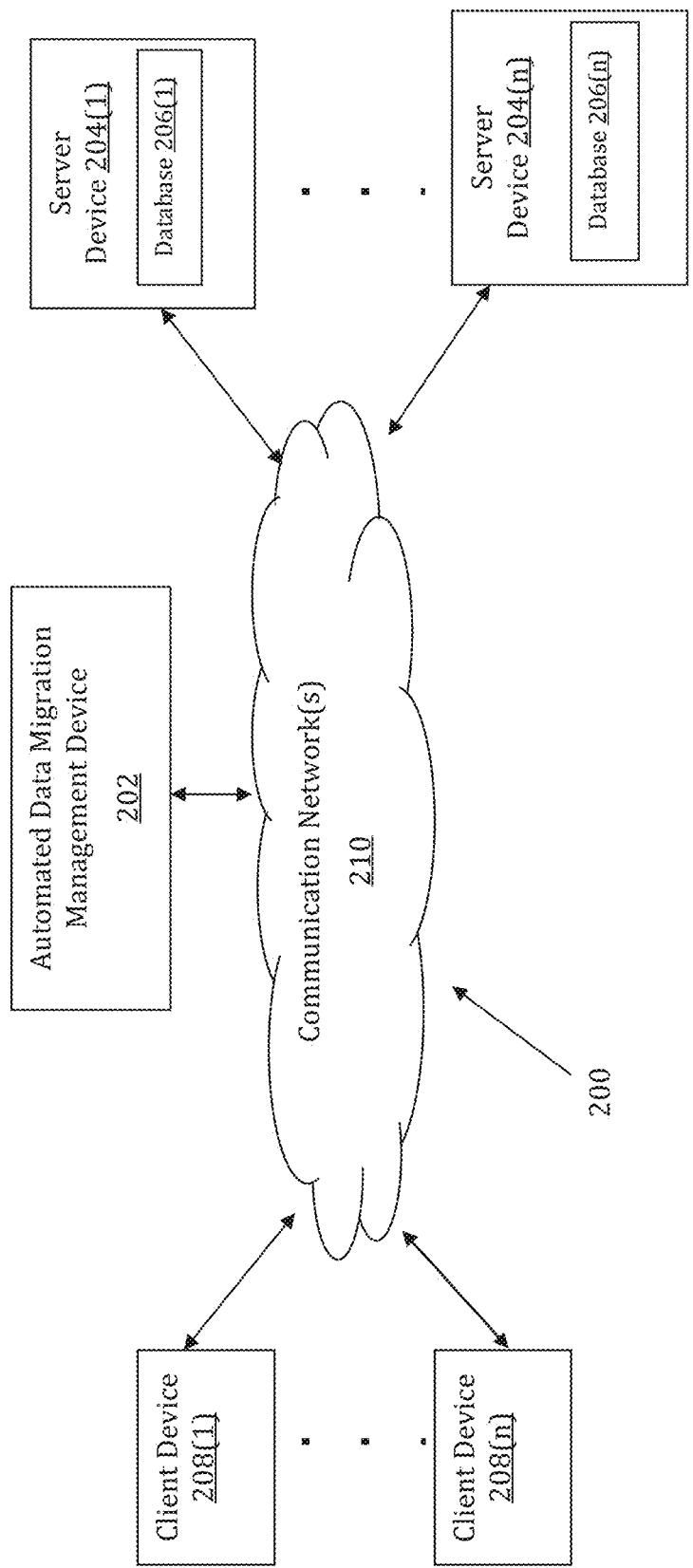
FIG. 2 illustrates an exemplary diagram of a network environment.

Referring to FIG. 2, a schematic of an exemplary network environment 200 for implementing a method for facilitating automated synchronous data migration from a live database system to a target database system is illustrated. In an exemplary embodiment, the method is executable on any networked computer platform, such as, for example, a personal computer (PC).

The method for facilitating automated synchronous data migration from a live database system to a target database system may be implemented by an Automated Data Migration Management (ADMM) device 202. The ADMM device 202 may be the same or similar to the computer system 102 as described with respect to FIG. 1. The ADMM device 202 may store one or more applications that can include executable instructions that, when executed by the ADMM device 202, cause the ADMM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ADMM device 202 itself, may be located in virtual server(s) running in a cloud-based computing environment rather than being tied to one or more specific physical network computing devices. Also, the application(s) may be running in one or more virtual machines (VMs) executing on the ADMM device 202. Additionally, in one or more embodiments of this technology, virtual machine(s) running on the ADMM device 202 may be managed or supervised by a hypervisor.

In the network environment 200 of FIG. 2, the ADMM device 202 is coupled to a plurality of server devices 204(1)-204(n) that hosts a plurality of databases 206(1)-206(n), and also to a plurality of client devices 208(1)-208(n) via communication network(s) 210. A communication interface of the ADMM device 202, such as the network interface 114 of the computer system 102 of FIG. 1, operatively couples and communicates between the ADMM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADMM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ADMM devices that efficiently implement a method for facilitating automated synchronous data migration from a live database system to a target database system.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ADMM device 202 may be a standalone device or integrated with one or more other devices or apparatuses, such as one or more of the server devices 204(1)-204(n), for example. In one particular example, the ADMM device 202 may include or be hosted by one of the server devices 204(1)-204(n), and other arrangements are also possible. Moreover, one or more of the devices of the ADMM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ADMM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to data tables, data characteristics, groups, tests, source databases, target databases, copied groups, errors, and corrective actions.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ADMM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ADMM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ADMM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADMM device 202, the server devices 204(1)-204(n), or the client devices 208(1)-208(n), for example, may be configured to operate as virtual instances on the same physical machine. In other words, one or more of the ADMM device 202, the server devices 204(1)-204(n), or the client devices 208(1)-208(n) may operate on the same physical device rather than as separate devices communicating through communication network(s) 210. Additionally, there may be more or fewer ADMM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
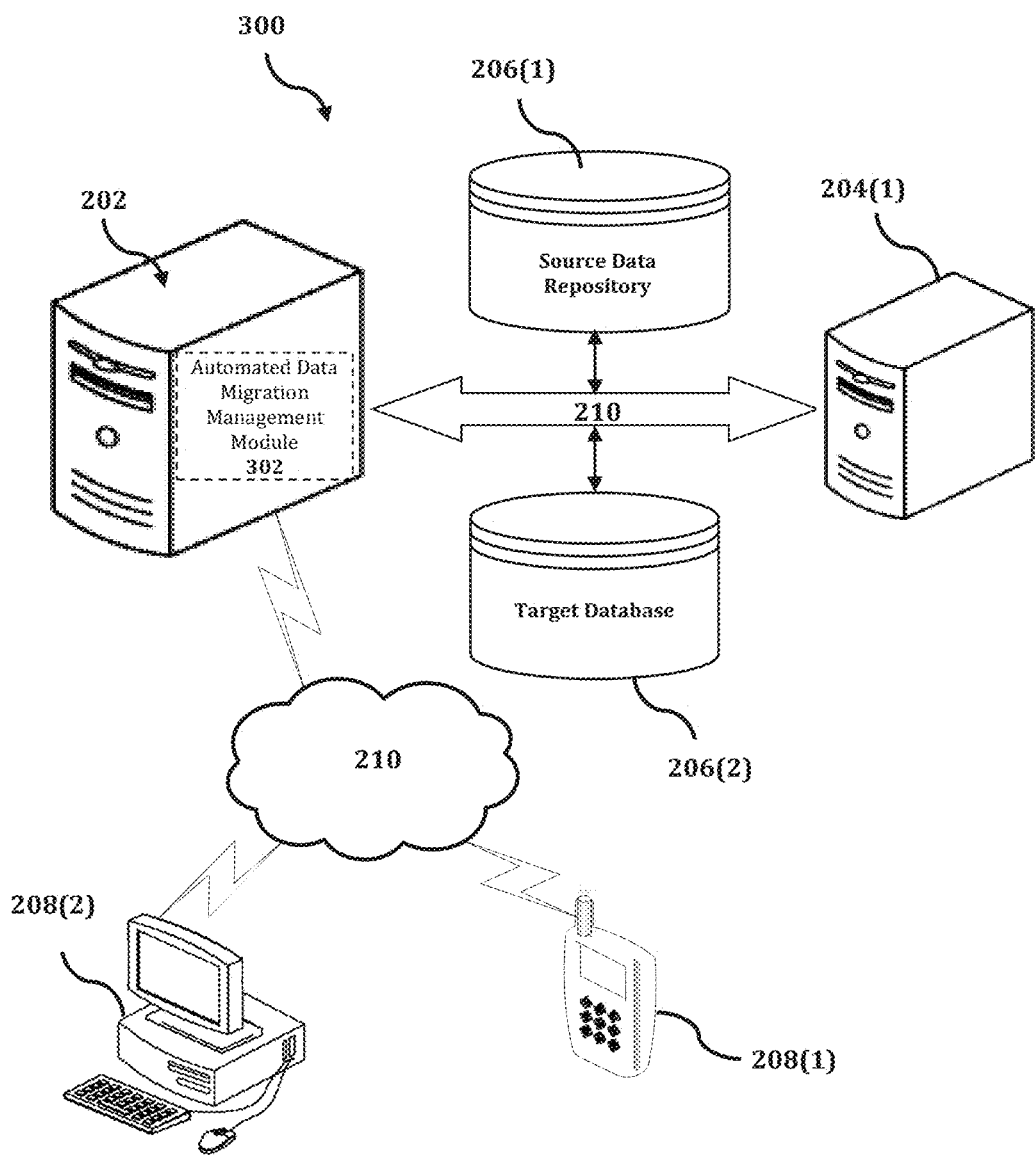
FIG. 3 shows an exemplary system for implementing a method for facilitating automated synchronous data migration from a live database system to a target database system.

The ADMM device 202 is described and shown in FIG. 3 as including an automated data migration management module 302, although it may include other rules, policies, modules, databases, or applications, for example. As will be described below, the automated data migration management module 302 is configured to implement a method for facilitating automated synchronous data migration from a live database system to a target database system.

An exemplary process 300 for implementing a mechanism for facilitating automated synchronous data migration from a live database system to a target database system by utilizing the network environment of FIG. 2 is shown as being executed in FIG. 3. Specifically, a first client device 208(1) and a second client device 208(2) are illustrated as being in communication with ADMM device 202. In this regard, the first client device 208(1) and the second client device 208(2) may be "clients" of the ADMM device 202 and are described herein as such. Nevertheless, it is to be known and understood that the first client device 208(1) and/or the second client device 208(2) need not necessarily be "clients" of the ADMM device 202, or any entity described in association therewith herein. Any additional or alternative relationship may exist between either or both of the first client device 208(1) and the second client device 208(2) and the ADMM device 202, or no relationship may exist.

Further, ADMM device 202 is illustrated as being able to access a source data repository 206(1) and a target database 206(2). The automated data migration management module 302 may be configured to access these databases for implementing a method for facilitating automated synchronous data migration from a live database system to a target database system.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ADMM device 202 via broadband or cellular communication. Of course, these embodiments are merely exemplary and are not limiting or exhaustive.

Upon being started, the automated data migration management module 302 executes a process for facilitating automated synchronous data migration from a live database system to a target database system. An exemplary process for facilitating automated synchronous data migration from a live database system to a target database system is generally indicated at flowchart 400 in FIG. 4.

Figure 4:
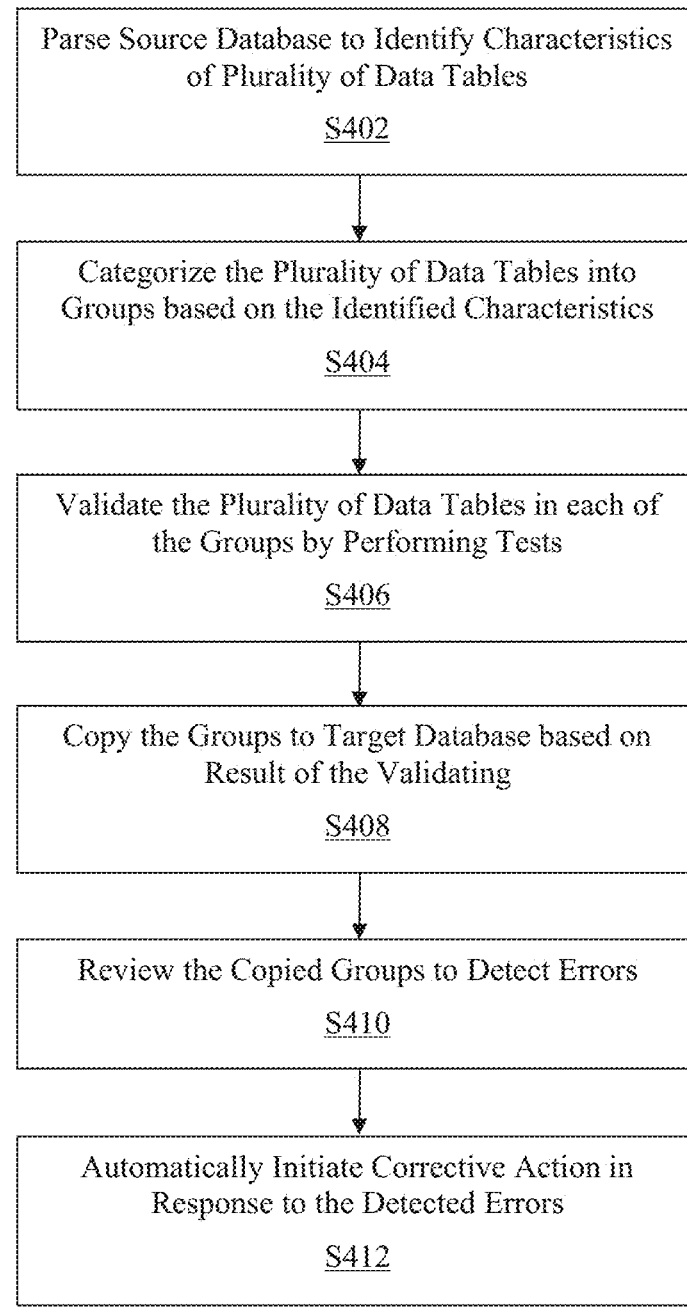
FIG. 4 is a flowchart of an exemplary process for implementing a method for facilitating automated synchronous data migration from a live database system to a target database system.

In the process 400 of FIG. 4, at step S402, a source database may be parsed to identify data characteristics. The data characteristics may correspond to each of a plurality of data tables in the source database. In an exemplary embodiment, the source database may include data that is intended for migration to a target database. The data in the source database may be copied and/or synchronized with the target database to facilitate migration of the data from the source database to the target database.

In another exemplary embodiment, the source database may correspond to an organized collection of structured electronic information that is stored in a computer system. The source database may be controlled by a database management system that enables the storage, retrieval, and execution of queries on data stored in the database.

In another exemplary embodiment, the source database may include data storage models such as, for example, relational data storage models that correspond to a collection of data items with pre-defined relationships. The data items may be organized as a set of tables with columns and rows. The tables may be used to hold information about objects to be represented in the database. In another exemplary embodiment, the source database may include a live database that is actively used by connected computing systems. The live database may correspond to an active database in a production environment and/or a deployment environment that is available for access by end users such as, for example, a connected application.

In another exemplary embodiment, the source database may include a hierarchical data warehouse that stores data in files and/or folders. The hierarchical data warehouse may relate to a data model that stores data in the form of records and is organized into a tree-like structure. In another exemplary embodiment, the source database may relate to a centralized repository such as, for example, a data lake that enables the storage of unstructured data in a native data format. The data lake may utilize a flat architecture and object storage to persist the unstructured data.

In another exemplary embodiment, the data characteristics may include at least one from among a primary key characteristic and a date characteristic. The primary key characteristic may relate to whether a primary key is present in the plurality of data tables. The date characteristic may relate to a data partitioned by date. In another exemplary embodiment, the data characteristics may include key characteristics that relate to at least one from among a primary key, a unique key, and a foreign key. For a database, a key may correspond to one or more columns that are predesignated as either the primary key, the unique key, and the foreign key.

In another exemplary embodiment, the primary key may define a corresponding data table. Requirements for the primary key may indicate that the primary key must have a value that is not null and that the primary key must be unique with a unique index. In another exemplary embodiment, the unique key may represent unique values within a data column. For example, a unique index may be created on an employee number column to designate the column as a unique key. In another exemplary embodiment, the foreign key may correspond to a key that is specified in a referential integrity constraint such that the existence of the key is dependent on a primary key or a unique key in another table, i.e., a parent key.

At step S404, the plurality of data tables may be categorized into groups based on the identified characteristics. The general characteristics of the plurality of tables for copying and/or synchronizing to a target database may be used to put each of the plurality of data tables into one or more groups. In an exemplary embodiment, types of groups and types of tables within each of the groups may be flexibly determined. The groups may be created for monitoring progress as well as structured for copying data.

In another exemplary embodiment, a particular table may be categorized into many groups and a specific group may be created for specific one-time executions. The groups may correspond to a collection of data tables and may be designed to execute with other groups. The content of the groups may be changed from one execution to another. In another exemplary embodiment, end data may not contain any details on what the groups were that loaded the data. Consistent with present disclosures, a log may contain details of what happened during execution, but subsequent executions may have replaced a subset of data from the initial execution. In another exemplary embodiment, once the data tables are categorized, a call may be used to generate configuration entries. The configuration entries may be validated to ensure intended operability.

At step S406, the plurality of data tables in each of the groups may be validated by performing tests and checks. In an exemplary embodiment, entries in the groups may be validated. The validation may correspond to a one-time process for the group. In another exemplary embodiment, the validation may test several aspects of the entries to ensure that the disclosed process will not run for an extended amount of time only to fail due to a fault in the plurality of data tables.

In another exemplary embodiment, the tests and checks may include at least one from among a first test that determines read access to a corresponding source table, a second test that determines whether a partition key column and an audit column are in the plurality of data tables, a third test that determines trigger operability, and a fourth test that determined an order of the plurality of data tables based on a foreign key and a parent key. The third test may ensure that triggers have the appropriate code to prevent activation. The fourth test may ensure that the order of data tables with foreign keys has the parent keys first.

In another exemplary embodiment, the tests and checks may also validate column names, validate read access to the source table, validate write access to the target table, validate foreign key relationships, and verify that triggers have appropriate logic to prevent code execution as a result of the copy process. The processing order for the foreign keys may be defined such that the dependent tables are after the parent tables.

At step S408, the groups may be copied to a target database based on a result of the validating. In an exemplary embodiment, the copying action may be initiated when the result of the validating indicates a positive fault status for the data tables. The positive fault status may correspond to an indication that faults do not exist in the data tables. The positive fault status may also correspond to an indication that an acceptable level of faults exists in the data tables. The acceptable level of faults may be predetermined based on user preference.

In another exemplary embodiment, validation of the data tables may automatically initiate the copy action according to a predetermined user preference. For example, a user may designate that the copying action is automatically initiated for a group when the group is positively validated. In another exemplary embodiment, intervention by the user may be required to initiate the copy action after the validation. For example, a validation notification with information that relates to the validating may be presented to the user with user input options to initiate the copying action.

In another exemplary embodiment, the copy action may be executed repeatedly based on the groups. The user may initiate the copy action by using several runtime inputs that can be used on circumstances associated with the groups. For example, a call to a main processing procedure for various circumstances may be represented as procedure copy_data_group (
  f_copy_group varchar2,
  f_start_date date default null,
  f_end_date date default null,
  f_date_direction varchar2 default 'F',
  f_action varchar2,
  f_max_days integer default null,
  f_stop_after date default null,
  f_pre_copy_action_override varchar2 default null,
  f_copy_action_override varchar2 default null,
  f_post_copy_action_override varchar2 default null,
  f_compare_audit_columns varchar2 default 'Y',
  f_runtime_options varchar2 default null,
  f_starting_seq_no integer default null,
  f_ending_seq_no integer default null,
  f_target_table varchar2 default null,
  f_logging_tag varchar2 default null).

In another exemplary embodiment, the date column may be required to be in the configuration table when the data is processed day-by-day. The start and end dates of the data may be required to be specified to achieve desired results. An option may be available to process the data from oldest to most recent as well as from most recent to oldest. In another exemplary embodiment, when processing day-by-day, active data tables may be required to have the date column specified. The presence or absence of a data column may not be relevant when processing the entire data table.

In another exemplary embodiment, the data tables to be processed may be considered. Once the groups are specified, the groups may be refined by providing additional arguments. When multiple options are provided, all options must be satisfied. In another exemplary embodiment, specified conflicting criteria may not have resulting tables. Similarly, interactions and differences may exist between specifying dates and restricting tables. When sequence values are used, the sequence values may be applied for each date resulting in missing data. When a single table is used, there may not be missing data because only one table is getting copied.

At step S410, the copied groups may be reviewed to detect errors. In an exemplary embodiment, the copied groups may be reviewed by comparing the copied groups in the target database with the corresponding groups in the source database. The errors may be detected based on a result of the comparing. The errors may include at least one from among a missing data error, an extra data error, and a different data error. In another exemplary embodiment, the comparing may include at least one from among a first assessment of individual data values within the copied groups and a second assessment of data rows within the copied groups. For example, every column and every row of the copied data may be compared to identify differences. Conversely, a number of rows may be counted to identify differences in the copied data.

In another exemplary embodiment, the copy and compare processes may take place in different transactions. When the data in the source database changes in an interval between the copy and the compare processes, differences may be reported. A subsequent execution of the compare process may re-sync the data and the differences may go away. In another exemplary embodiment, differences may be introduced when the triggers are not properly configured. When table triggers are configured to bypass trigger logic, the trigger logic may be bypassed during the comparing process. However, when the triggers are not properly configured, the triggers may activate and update the audit columns resulting in differences.

In another exemplary embodiment, the accuracy of the comparison may depend on whether the primary key as defined in the configuration table matches the real primary key in the database as well as whether the primary key constraints are enabled. Similarly, the accuracy of the comparison may depend on whether the audit columns are properly defined. The configuration settings and runtime settings may allow for specifying columns to be ignored during the compare process. For example, when differences are expected, the expected differences may be ignored.

In another exemplary embodiment, when differences are identified, a log may report the primary key columns so the source data and the target data may be compared manually for the first ten differences identified. The log may not report the columns that are different. In another exemplary embodiment, the differences may be stated from the perspective of the target system as missing data, extra data, and different data. The missing data designation may indicate that rows exist in the target database but not in the source database. The extra data designation may indicate that rows exist is the source database but not in the target database. The different data designation may indicate that a row exists with different data.

In another exemplary embodiment, an additional mechanism relating to subgrouping may be provided to manage the amount of work attempted in one pass. The configuration table may be configured to add a single column that is usable to break the data into buckets as well as to define a number of buckets. When the data table is getting processed day-to-day, each day may be broken into the specified number of buckets such that each bucket is processed individually. The bucket defining column may correspond to a column with many different values. The limits for each bucket may be determined based on the actual data tables such that each bucket is approximately the same size. The bucketing process may be ignored when the number of buckets is less than zero.

At step S412, corrective actions may be automatically initiated in response to the detected errors. In an exemplary embodiment, the corrective actions may be automatically initiated based on a predetermined user preference and a severity level associated with the detected errors. For example, for a low severity level error, the user may indicate that corrective actions are automatically initiated. Conversely, for a high severity level error, the user may want to review the error prior to initiation of any corrective actions.

In another exemplary embodiment, the corrective actions may include a restart action. The restart action may truncate and/or delete all data and restart the copy action consistent with present disclosures. In another exemplary embodiment, the corrective actions may include a partial restart action. The partial restart action may truncate data for a partial day and execute all tables from that date forward. In another exemplary embodiment, the corrective actions may include a next day action. The next day action may execute all tables from the next date and run a parallel session that starts with the first unprocessed table for just the partial date.

In another exemplary embodiment, a new data set may be received from outside processes for persistence in the source database. For example, a connected application may write data to a live database. A duplicate data set that corresponds to the new data set may be generated consistent with present disclosures. Then, the new data set may be persisted in the source database in real-time. Similarly, the duplicate data set may be persisted in the target database in real-time. In another exemplary embodiment, the new data set and the duplicate data set may be persisted synchronously in the source database and the target database, respectively.

In another exemplary embodiment, prior to persisting the new data set and the duplicate data set, the new data set may be parsed to identify triggers. The triggers may correspond to requested actions. For example, a trigger in the new data set may initiate an action that changes values in a corresponding data table. Then, the identified triggers may be reconfigured in the duplicate data set to prevent activation. As will be appreciated by a person of ordinary skill in the art, preventing activation of the triggers in the duplicate data set may prevent data differences between the source database and the target database.

In another exemplary embodiment, activity logs may be automatically generated. The activity logs may include information that relates to the copying of the groups, the result of the comparing, the detected errors, and the corrective actions. Then, the activity logs may be persisted in a database such as, for example, the target database consistent with present disclosures. In another exemplary embodiment, a notification may be generated when the errors are detected. The notification may include information that relates to the errors and suggested corrective actions. A responsible party may be identified based on a type of the error and a predetermined guideline. Then, the notification may be transmitted to the identified responsible party.

Figure 5:
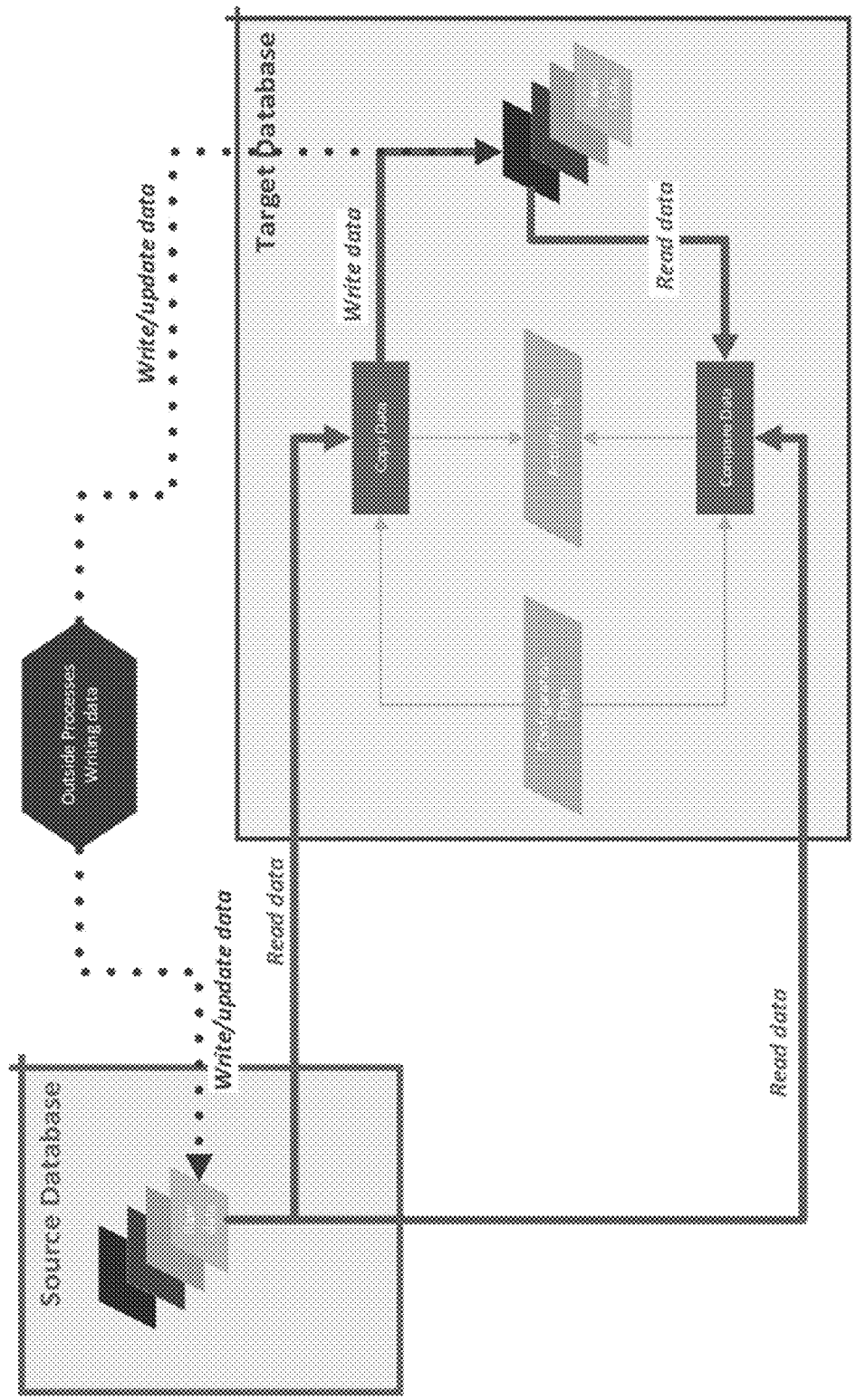
FIG. 5 is a data flow diagram of an exemplary process for implementing a method for facilitating automated synchronous data migration from a live database system to a target database system.

FIG. 5 is a data flow diagram 500 of an exemplary process for implementing a method for facilitating automated synchronous data migration from a live database system to a target database system. In FIG. 5, live data may be actively processed during the data migration process to prevent downtime associated with an inactive database.

As illustrated in FIG. 5, data copy actions and data comparison actions may be initiated consistent with present disclosures to migrate data from a source database to a target database. Configuration data may be usable to facilitate the data migration and an activity log may be usable for documentation. The configuration data may define the source table, the target table, the processing group, and the processing sequence within the group for each data table to be copied. Optionally, the configuration data may identify a column that defines the data partition and the number of chunks with which to process a table for the partitioned date.

When outside processes write data to the active source database, a duplicate data set may be generated and written to the target database. This duplication ensures that up to date data are included in the data migration to the target database while preventing downtime associated with an inactive source database. To prevent data errors associated with duplicating triggers, the triggers in the duplicate data set may be inactivated. The triggers may be inactivated by using an automated process consistent with present disclosures to reconfigure the triggers.

Figure 6:
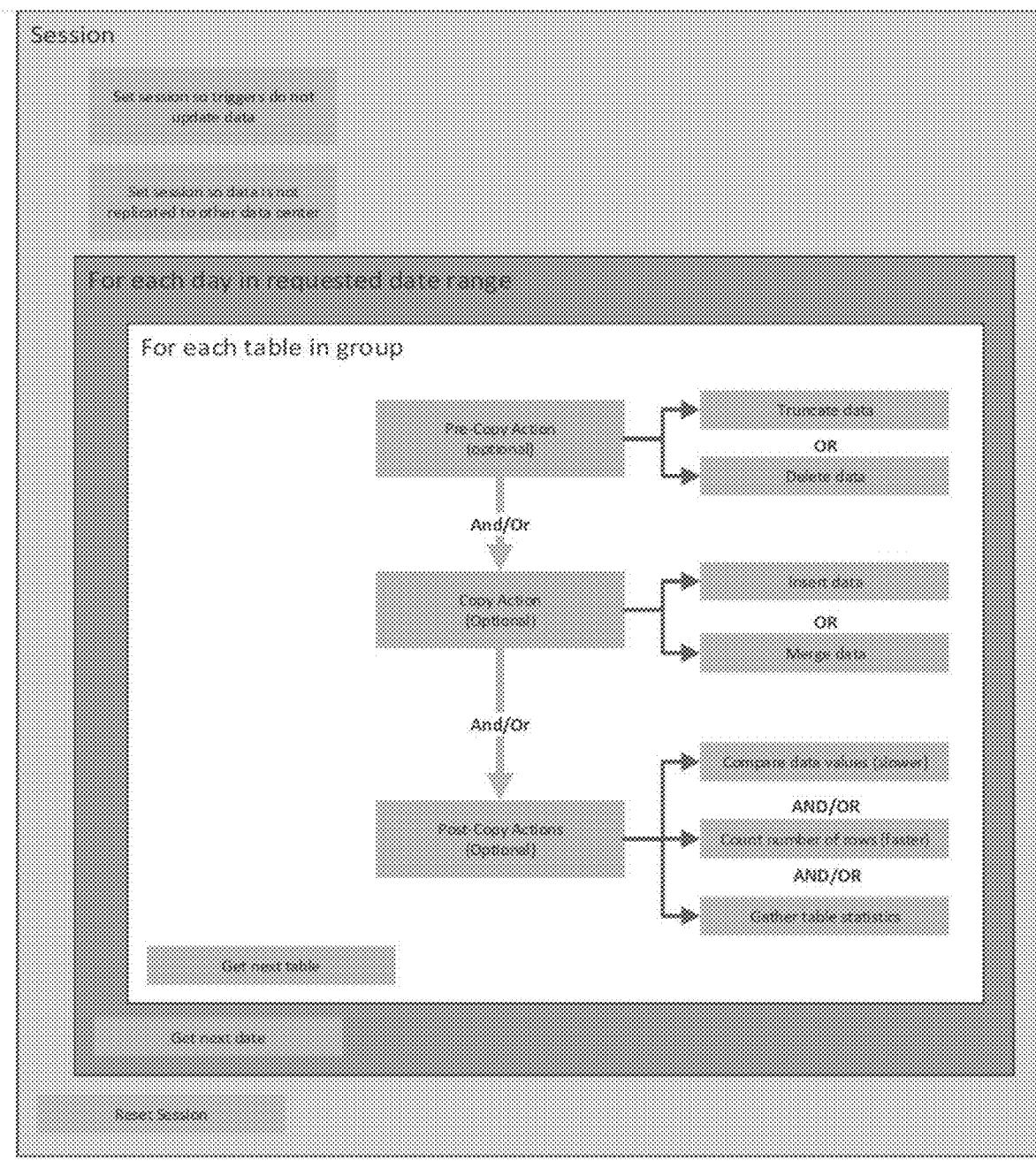
FIG. 6 is a session flow diagram of an exemplary process for implementing a method for facilitating automated synchronous data migration from a live database system to a target database system.

FIG. 6 is a session flow diagram 600 of an exemplary process for implementing a method for facilitating automated synchronous data migration from a live database system to a target database system. In FIG. 6, the session may correspond to batch processing of the groups consistent with present disclosures.

As illustrated in FIG. 6, data tables that are placed into groups may be processed together for simplicity in bulk processing sessions. The sessions may be set so that triggers do not update the data and so that data is not replicated to other data centers. For each table in a group, pre-copy actions, copy actions, and post-copy actions may be initiated. The pre-copy actions may include a truncate data action or a delete data action. The copy action may include an insert data action or a merge data action. The post-copy actions may include a compare data values action, a count number of rows action, and/or a gather table statistics action.

Figure 7:
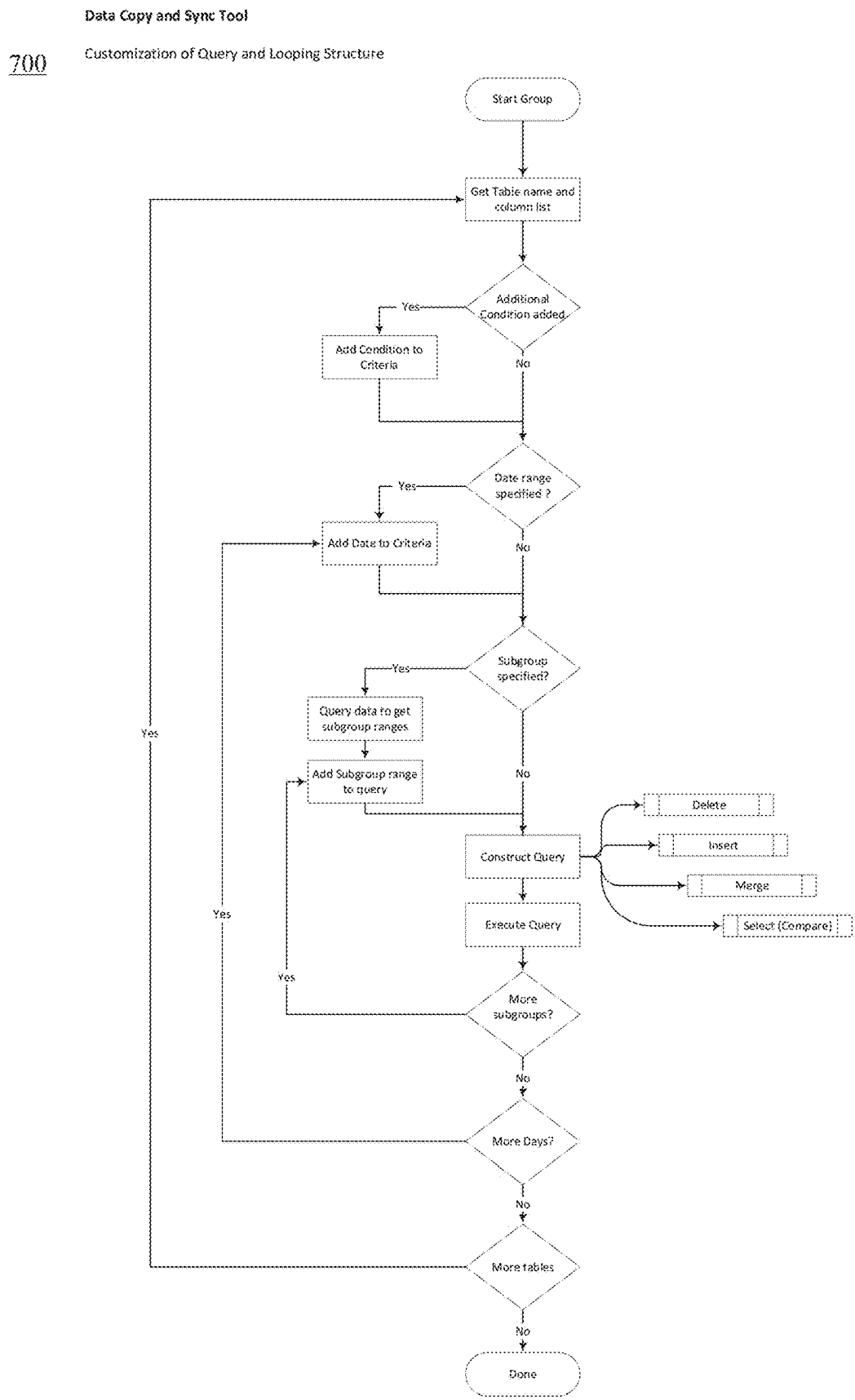
FIG. 7 is a diagram of an exemplary data copy and sync process for implementing a method for facilitating automated synchronous data migration from a live database system to a target database system.

FIG. 7 is a diagram 700 of an exemplary data copy and sync process for implementing a method for facilitating automated synchronous data migration from a live database system to a target database system. In FIG. 7, the data copy and sync tool may facilitate customization of query and looping structure.

Accordingly, with this technology, an optimized process for facilitating automated synchronous data migration from a live database system to a target database system is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated synchronous data migration in live databases, the method being implemented by at least one processor, the method comprising:

parsing, by the at least one processor, at least one source database to identify at least one characteristic, the at least one characteristic corresponding to each of a plurality of data tables;

categorizing, by the at least one processor, the plurality of data tables into at least one group based on the identified at least one characteristic;

validating, by the at least one processor, the plurality of data tables in each of the at least one group by performing at least one test;

copying, by the at least one processor, the at least one group to at least one target database based on a result of the validating;

reviewing, by the at least one processor, the copied at least one group to detect at least one error; and automatically initiating, by the at least one processor, at least one corrective action in response to the detected at least one error.

2. The method of claim 1, further comprising:

receiving, by the at least one processor, at least one new data set from at least one application for persistence in the at least one source database, the at least one source database corresponding to a live database;

generating, by the at least one processor, at least one duplicate data set that corresponds to the at least one new data set; and synchronously persisting, by the at least one processor in real-time, the at least one new data set in the at least one source database and the at least one duplicate data set in the at least one target database.

3. The method of claim 2, wherein, prior to the persisting, the method further comprises:

parsing, by the at least one processor, the at least one new data set to identify at least one trigger, the at least one trigger corresponding to a requested action; and reconfiguring, by the at least one processor, the identified at least one trigger in the at least one duplicate data set to prevent activation.

4. The method of claim 1, wherein the at least one characteristic includes at least one from among a primary key characteristic and a date characteristic, the primary key characteristic relating to whether a primary key is present in the plurality of data tables, and the date characteristic relating to a data partitioned by date.

5. The method of claim 1, wherein the at least one test includes at least one from among a first test that determines read access to a corresponding source table, a second test that determines whether a partition key column and an audit column are in the plurality of data tables, a third test that determines trigger operability, and a fourth test that determines an order of the plurality of data tables based on a foreign key and a parent key.

6. The method of claim 1, wherein reviewing the copied at least one group further comprises:

comparing, by the at least one processor, the copied at least one group in the at least one target database with the corresponding at least one group in the at least one source database; and detecting, by the at least one processor, the at least one error based on a result of the comparing, the at least one error including at least one from among a missing data error, an extra data error, and a different data error.

7. The method of claim 6, wherein the comparing includes at least one from among a first assessment of individual data values within the copied at least one group and a second assessment of data rows within the copied at least one group.

8. The method of claim 6, further comprising:

automatically generating, by the at least one processor, at least one activity log, the at least one activity log including information that relates to the copying of the at least one group, the result of the comparing, the detected at least one error, and the at least one corrective action; and persisting, by the at least one processor, the at least one activity log in the at least one target database.

9. The method of claim 6, further comprising:

generating, by the at least one processor, a notification when the at least one error is detected, the notification including information that relates to the at least one error and at least one suggested corrective action;

identifying, by the at least one processor, at least one responsible party based on the at least one error; and transmitting, by the at least one processor, the notification to the identified at least one responsible party.

10. A computing device configured to implement an execution of a method for facilitating automated synchronous data migration in live databases, the computing device comprising:

a processor;

a memory; and a communication interface coupled to each of the processor and the memory, wherein the processor is configured to:

parse at least one source database to identify at least one characteristic, the at least one characteristic corresponding to each of a plurality of data tables;

categorize the plurality of data tables into at least one group based on the identified at least one characteristic;

validate the plurality of data tables in each of the at least one group by performing at least one test;

copy the at least one group to at least one target database based on a result of the validating;

review the copied at least one group to detect at least one error; and automatically initiate at least one corrective action in response to the detected at least one error.

11. The computing device of claim 10, wherein the processor is further configured to:

receive at least one new data set from at least one application for persistence in the at least one source database, the at least one source database corresponding to a live database;

generate at least one duplicate data set that corresponds to the at least one new data set; and synchronously persist, in real-time, the at least one new data set in the at least one source database and the at least one duplicate data set in the at least one target database.

12. The computing device of claim 11, wherein, prior to the persisting, the processor is further configured to:

parse the at least one new data set to identify at least one trigger, the at least one trigger corresponding to a requested action; and reconfigure the identified at least one trigger in the at least one duplicate data set to prevent activation.

13. The computing device of claim 10, wherein the at least one characteristic includes at least one from among a primary key characteristic and a date characteristic, the primary key characteristic relating to whether a primary key is present in the plurality of data tables, and the date characteristic relating to a data partitioned by date.

14. The computing device of claim 10, wherein the at least one test includes at least one from among a first test that determines read access to a corresponding source table, a second test that determines whether a partition key column and an audit column are in the plurality of data tables, a third test that determines trigger operability, and a fourth test that determines an order of the plurality of data tables based on a foreign key and a parent key.

15. The computing device of claim 10, wherein, to review the copied at least one group, the processor is further configured to:

compare the copied at least one group in the at least one target database with the corresponding at least one group in the at least one source database; and detect the at least one error based on a result of the comparing, the at least one error including at least one from among a missing data error, an extra data error, and a different data error.

16. The computing device of claim 15, wherein the comparing includes at least one from among a first assessment of individual data values within the copied at least one group and a second assessment of data rows within the copied at least one group.

17. The computing device of claim 15, wherein the processor is further configured to:
  automatically generate at least one activity log, the at least one activity log including information that relates to the copying of the at least one group, the result of the comparing, the detected at least one error, and the at least one corrective action; and
  persist the at least one activity log in the at least one target database.

18. The computing device of claim 15, wherein the processor is further configured to:
  generate a notification when the at least one error is detected, the notification including information that relates to the at least one error and at least one suggested corrective action;
  identify at least one responsible party based on the at least one error; and
  transmit the notification to the identified at least one responsible party.

19. A non-transitory computer readable storage medium storing instructions for facilitating automated synchronous data migration in live databases, the storage medium comprising executable code which, when executed by a processor, causes the processor to:
  parse at least one source database to identify at least one characteristic, the at least one characteristic corresponding to each of a plurality of data tables;
  categorize the plurality of data tables into at least one group based on the identified at least one characteristic;
  validate the plurality of data tables in each of the at least one group by performing at least one test;
  copy the at least one group to at least one target database based on a result of the validating;
  review the copied at least one group to detect at least one error; and
  automatically initiate at least one corrective action in response to the detected at least one error.

20. The storage medium of claim 19, wherein the executable code, when executed by the processor, further causes the processor to:
  receive at least one new data set from at least one application for persistence in the at least one source database, the at least one source database corresponding to a live database;
  generate at least one duplicate data set that corresponds to the at least one new data set; and
  synchronously persist, in real-time, the at least one new data set in the at least one source database and the at least one duplicate data set in the at least one target database.

* * * * *